Sept. 3, 1963    J. F. SCOTT    3,102,571
SCREW FASTENERS
Filed Dec. 12, 1960

INVENTOR
John F. Scott
BY
H. F. Johnston
ATTORNEY

United States Patent Office 3,102,571
Patented Sept. 3, 1963

3,102,571
SCREW FASTENERS
John F. Scott, Waterbury, Conn., assignor to Scovill Manufacturing Company, Waterbury, Conn., a corporation of Connecticut
Filed Dec. 12, 1960, Ser. No. 75,205
2 Claims. (Cl. 151—7)

This invention relates to a combined screw and washer, and particularly, to one in which the screw and washer are made as one integral unit from plastic material.

In the electrical field, and particularly the electronics industry, numerous screws and washers are required for making assemblies and sub-assemblies of component parts. These fasteners are generally made of plastic material due not only to the non-conductive properties of plastic, but also due to lower manufacturing costs.

With the present trend toward miniaturization of components have come difficulties in assembling the small parts involved. It is, therefore, the principal object of this invention to provide a combined screw and washer made of plastic material which can be readily handled and quickly assembled into any mechanism requiring parts or units to be joined together with the minimum of effort.

Another object is to attach the washer to the threaded portion of the shank in such a manner that the washer, when broken away or severed from the screw shank, produces a mutilated or interrupted thread to create a frictional or locking effect when the screw is assembled to its complementary part.

Another object of this invention is to attach the washer to the threaded section of the shank, preferably closer to the leading end of the shank than to the head end of the screw. This will insure that the mutilated section of the thread produced when said washer is broken away, will engage the thread of the complementary part.

A further object of the invention is to construct the washer in such a manner that it will afford a spring-locking or binding action to the screw when it is completely assembled to its complementary part.

These and other objects and advantages of the invention will appear from the following description of the several embodiments illustrated in the accompanying drawing, in which.

Figure 1:
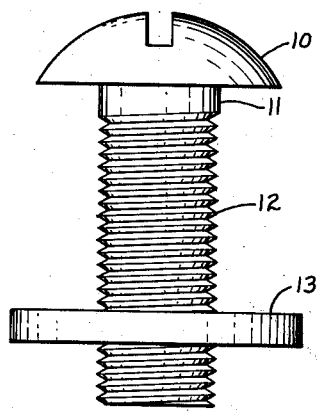
FIG. 1 is a side view of a combined screw and washer embodying the invention.
Figure 2:
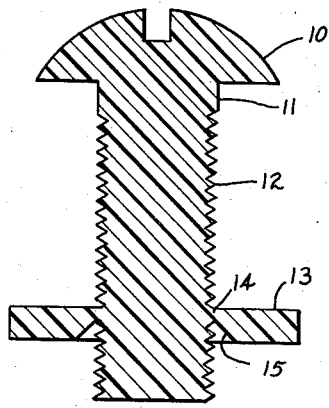
FIG. 2 is a cross-sectional view of the same.
Figure 3:
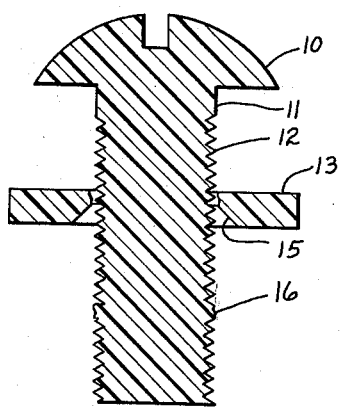
FIG. 3 is a similar view showing the washer severed from its initial point of attachment.

Referring now to the drawing, FIGS. 1, 2 and 3 show the first form of the invention wherein the screw has a head 10 and a shank 11 with a threaded section 12 extending the major length of said shank. Integrally attached to the threaded section 12 is a plain annular washer 13 in a position to provide more than one complete thread convolution on each side of the washer. The attachment of the washer is by means of a frangible section 14 having an axially extending thickness exceeding one-half of the thread pitch and providing the minimum cross-sectional area between the washer and shank, and the washer is preferably closer to the leading end of the screw shank than to the head end. However, it should be understood that the washer can be attached anywhere along the length of the threaded section 12. The frangible section 14 is wholly outside of a cylindrical surface defined by the roots of the threads and substantially within a cylindrical surface defined by the crests of said threads.

The underside of the washer 13 has a conical undercut 15 extending to the crest portions of the threads to reduce the thickness of the frangible section and thereby reduce the amount of force required to shear or sever the washer from the threaded shank 12. When the washer is broken away, a mutilated or interrupted threaded area 16 results that will produce a frictional or binding action when the screw is threaded into a tapped hole. However, it should be understood that if no frictional or binding action is desired in the screw, the washer can be connected to the crest of one of the threads where it can be axially sheared away with no interruptions to the continuity of the thread.

Figure 4:
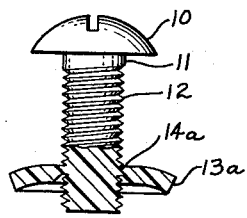
FIG. 4 is a sectional view on a smaller scale showing a modified form of resilient washer attached to the threaded shank.
Figure 5:
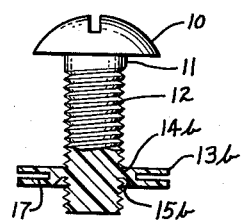
FIG. 5 is a similar view showing another form of resilient washer attached to the shank.

Should it be desired, a greater locking or binding feature can be embodied within the washer itself, as shown in FIGS. 4 and 5.

In FIG. 4, the screw 10 is the same as disclosed in the first form, but the washer 13a is arched downwardly from its area of attachment 14a to the threaded section. When the screw is assembled into a complementary unit, the washer 13a will be compressed and flattened between the flat undersurface of the screw head 10 and the surface of the unit to which the screw is attached. The flattened washer, which is under tension, will provide an added binding or locking feature to the screw.

In FIG. 5, the locking washer 13b is formed with a relatively deep slot 17, formed inwardly from the peripheral edge of said washer. The depth of the slot 17 is such that it will approach relatively close to the conical undercut 15b adjacent the area of attachment 14b. It will be apparent that when the washer 13b is compressed between two surfaces, the washer will be axially distorted and thus build up a strain factor that will add to the binding and locking feature of the screw.

Figure 6:
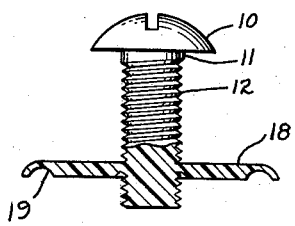
FIG. 6 shows still another modified form of the washer.
Figure 7:
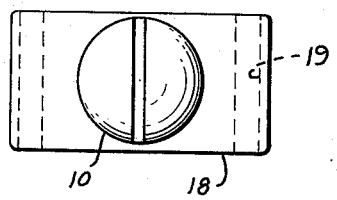
FIG. 7 is a top plan view of the same.

FIGS. 6 and 7 show another form of washer or support member 18 that would be useful in clamping electrical wires or conduits to a support member. For this purpose, the washer 18 is preferably a rectangularly shaped blank that is attached to the screw in a manner similar to the above-described washers. This washer is formed with a pair of parallel grooves 19 in its undersurface adjacent the narrow edges of said blank to accommodate the wires. It is also within the purview of this invention to provide various kinds of support members such as clamps, brackets, panels etc. with more than one screw attached thereto in a manner similar to the modification shown in FIGS. 6 and 7.

While several modifications of the combined screw and washer are disclosed, it will be apparent that other modifications will readily suggest themselves to persons skilled in the art and come within the scope of the following claims.

What I claim is:

1. A one-piece plastic screw and washer combination comprising
    (a) a head;
    (b) a shank extending from said head and having a threaded section;
    (c) an annular washer surrounding said shank intermediate the ends of said threaded section in a position to provide more than one complete thead convolution on each side of said washer; and,
    (d) a frangible section integrally joining said washer to said shank, said frangible section having an axially extending thickness exceeding one-half of the thread pitch and providing the minimum cross-sectional area between the washer and shank, said frangible section being positioned wholly outside of a cylindrical surface defined by the roots of the threads of said threaded section and substantially within a cylindrical surface defined by the crests of said threads, whereby when the screws is threaded into a tapped hole, said washer will break away from said shank leaving a portion of said frangible section on the shank intermediate the crests and roots of said threads to serve as a means for engagement by a co-operating thread to prevent accidental loosening of said screw.

2. A one-piece screw and washer combination as defined in the preceding claim wherein said washer adjacent said shank is provided with a conical undercut extending to the crest portions of said threads.

References Cited in the file of this patent
UNITED STATES PATENTS

| | | |
|---|---|---|
| 1,868,415 | Gundersen et al. | July 19, 1932 |

FOREIGN PATENTS

| | | |
|---|---|---|
| 22,886 | Germany | Apr. 26, 1956 |
| 816,562 | Great Britain | July 15, 1959 |